United States Patent [19]

Arai et al.

[11] Patent Number: 4,699,099
[45] Date of Patent: Oct. 13, 1987

[54] COMPOUND ENGINE MOUNT WITH VARIABLE ORIFICE

[75] Inventors: Katsuyoshi Arai; Hisao Nakamura, both of Wako, Japan

[73] Assignee: Honda Giken Kogyo Kabushiki Kaisha, Tokyo, Japan

[21] Appl. No.: 10,052

[22] Filed: Feb. 2, 1987

[30] Foreign Application Priority Data

Feb. 3, 1986 [JP] Japan .................................. 61-20169

[51] Int. Cl.⁴ .............................................. B62D 21/00
[52] U.S. Cl. .................................. 123/192 R; 267/35; 248/550; 180/312
[58] Field of Search ..................... 123/192 R; 180/312, 180/291; 267/8 R, 35, 140.1; 248/659, 550, 556, 636

[56] References Cited

U.S. PATENT DOCUMENTS

| | | | |
|---|---|---|---|
| 4,516,545 | 5/1985 | Kumugai et al. | 248/636 |
| 4,610,421 | 9/1986 | Ohta et al. | 248/659 |
| 4,635,910 | 1/1987 | Ozawa et al. | 267/140.1 |
| 4,641,808 | 2/1987 | Flower | 267/140.1 |
| 4,648,576 | 3/1987 | Matsui | 248/659 |

FOREIGN PATENT DOCUMENTS

| | | | |
|---|---|---|---|
| 57-129944 | 8/1982 | Japan | 267/140.1 |
| 58-54248 | 3/1983 | Japan | 267/140.1 |
| 0113833 | 6/1985 | Japan | 267/140.1 |
| 0113832 | 6/1995 | Japan | 267/140.1 |

*Primary Examiner*—Craig R. Feinberg
*Assistant Examiner*—David A. Okonsky
*Attorney, Agent, or Firm*—Armstrong, Nikaido, Marmelstein & Kubovcik

[57] ABSTRACT

A compound engine mount has a first and a second fluid chamber defined thereinside and communicated to each other by a first orifice which is controllable in length and a second orifice which is controllable in effective path area. In an engine idling range, the two fluid chambers are intercommunicated by the first orifice only. The length of the first orifice is controlled to change the mass of a fluid inside of the orifice in response to a length of the orifice, whereby the dynamic spring constant of the engine mount is controlled. In a high engine speed range, the fluid chambers are intercommunicated by the second orifice resulting in a decrease in the dynamic spring constant of the engine mount. The effective area of the second orifice is controllable to control the dynamic spring constant.

4 Claims, 5 Drawing Figures

COMPOUND ENGINE MOUNT WITH VARIABLE ORIFICE

BACKGROUND OF THE INVENTION

The present invention relates to a compound engine mount which absorbs vibrations by means of the elasticity of a rubber cushion and the resonance of fluid which flows through an orifice and, more particularly, to a complex engine mount of the type having a variable orifice.

In an automotive vehicle, vibration is developed over a wide range of frequencies and that of amplitudes depending upon the operating conditions of the vehicle, particularly the engine speed. An automotive engine, therefore, is often supported on a vehicle body by compound engine mounts which are capable of absorbing a wide range of vibrations. A compound engine mount includes a first fluid chamber which is surrounded by a rubber cushion and a second fluid chamber which is surrounded by a flexible diaphragm, the first and second fluid chambers being intercommunicated by an orifice. When the rubber cushion is greatly deformed by a load, the fluid is caused to move between the first and second fluid chambers through the orifice to absorb vibrations of large amplitudes. Vibrations of small amplitudes are absorbed by the deformation of the rubber cushion.

Generally, the orifice of such a compound engine mount is provided with fixed dimensions. A problem with an engine mount with a fixed orifice as mentioned is that low frequency vibrations which occur in an idling range of an engine cannot be absorbed unless the effective path area of the orifice is designed small enough to lower the resonance frequency of the fluid, which flows between the fluid chambers. Such would reduce the mass of the fluid inside of the orifice and, thereby, increase the dynamic spring constant, making it difficult for high frequency vibrations whose amplitude is small to be absorbed effectively. On the other hand, should the orifice be provided with a large effective path area in order to maintain a small dynamic spring constant even under high frequency vibrations, the resonance effect of the fluid would not be accomplished under low frequency oscillations.

In the light of the above, there has been proposed to provide fluid communication between the first and second fluid chambers through an orifice which has a relatively large area and is selectively opened and closed by a valve, as disclosed in Japanese Laid-Open Patent Publication (Kokai) No. 59-40945. The orifice disclosed is closed in response to low frequency vibrations and opened to high frequency vibrations, whereby the dynamic spring constant is increased under low frequency vibrations and decreased under high frequency vibrations. This, however, brings about another problem that the open-close or on-off control of the orifice results in noticeable changes in the dynamic spring constant. Hence, what this type of arrangement can do is simply switching the dynamic spring constant between two different kinds of operating conditions of a vehicle, i.e., special conditions such as rapid accelerating conditions and ordinary operating conditions, and not sequentially varying the dynamic spring constant in response to the change in vibration over the idling to the high speed ranges.

Meanwhile, the engine speed and, therefore, the vibration characteristic varies even in the idling range due to idle-up and others. Hence, the dynamic spring constant should preferably be controlled within the idling range as well. Although an arrangement may be made such that the effective path area of the orifice be continuously controllable in response to the varying engine speed, it cannot be achieved without resorting to a considerably difficult control since, in an idling range, the small area of the orifice should be further controlled.

Another implementation heretofore proposed is an engine mount in which the length of an orifice is controllable in a low frequency, large amplitude vibration range such as during engine cranking, as disclosed in Japanese Laid-Open Patent Publication (Kokai) No. 60-73146. This kind of scheme is disadvantageous in that because the sectional area of the orifice is too small to noticeably effect the volume of the orifice portion, or the mass of the fluid inside of the orifice portion, and only the damping coefficient is controlled, it is impossible to change the dynamic spring constant in response to an engine speed.

SUMMARY OF THE INVENTION

It is therefore an object of the present invention to control the dynamic spring constant of an engine mount optimumly in response to a change in vibration over the entire engine speed range, i.e., from the idling to the high speed ranges, thereby absorbing a wider range of vibrations than before.

It is another object of the present inveniton to delicately control the dynamic spring constant of an engine mount even within the idling range.

In order to achieve the above object, a compound engine mount of the present invention includes a first orifice which is controllable in length and a second orifice which is controllable in effective path area, the orifices serving to communicate two fluid chambers to each other. In an engine idling range the second orifice is closed and the length of the first orifice is controlled while, in a high engine speed range, the second orifice is controlled to control the effective path area of the entire orifices.

In the above construction, in the idling range, the two fluid chambers are intercommunicated by the first orifice while, at the same time, the length of the first orifice is controlled in response to an engine speed to change the mass of the fluid inside of the orifice. This allows the dynamic spring constant of the engine mount to be delicately controlled based on the varying engine speed. It is needless, therefore, for the first orifice to be increased in area, so that the resonance frequency of the fluid is maintained low enough to positively absorb low frequency vibrations.

In a high speed range, the two fluid chambers are intercommunicated by the second orifice whose area is large, reducing the dynamic spring constant of the engine mount. The area of the second orifice is controllable to control the dynamic spring constant to an optimum value for the instantaneous vibration.

In this manner, the dynamic spring constant of the engine mount is optimumly controlled over the entire engine speed ranges, i.e., from the idling range to the high speed range, whereby engine vibrations are absorbed effectively.

BRIEF DESCRIPTION OF THE DRAWINGS

The above and other objects, features and advantages of the present invention will become more apparent from the following detailed description taken with the accompanying drawings in which.

DETAILED DESCRIPTION OF THE PREFERRED EMBODIMENT

Figure 1:
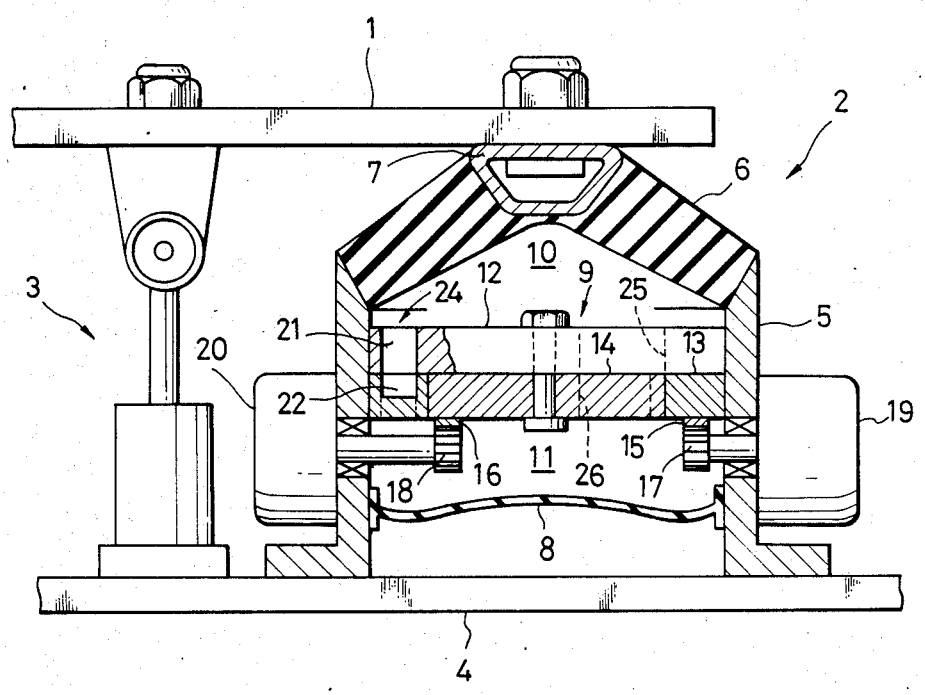
FIG. 1 is a vertically sectioned side elevation showing an essential part of a power unit support arrangement to which a compound engine mount embodying the present invention is applied.

Referring to FIG. 1 of the drawings, a power unit, not shown, which is made up of an engine, a power transmission and others is provided with a flange 1. The flange 1 is supported on a vehicle frame 4 by a compound engine mount 2 of the present invention and a damper 3, which is adapted to damp vibrations of large amplitudes which may occur during engine cranking, car shaking and other conditions.

The engine mount 2 includes a cylindrical housing 5 which is mounted on the frame 4, and a conical rubber cushion 6 which covers the top of the housing 5 fluid-tightly. A metal fixture 7 adapted to be fixed to the flange 1 is fitted on the top of the rubber cushion 6 by vulcanization. A lower end portion of the housing 5 is partitioned fluid-tightly by a thin flexible diaphragm 8 which may be made of rubber, for example. In this manner, the housing 5, rubber cushion 6 and diaphragm 8 cooperate to define a fluid-tight space. This space is divided by a partition plate 9 into a first or upper fluid chamber 10 and a second or lower fluid chamber 11. Oil or like incompressible fluid is confined in the chambers 10 and 11.

The partition plate 9 comprises a disk-like fixed plate 12 which is fixed to the housing 5, an annular first movable plate 13 held in close contact with a peripheral part of the plate 12, and a disk-like second movable plate 14 held in close contact with a central part of the plate 12 while being received in the center opening of the annular plate 13. An annular rack 15 is provided on the underside of the first movable plate 13 and held in mesh with a pinion 17. Likewise, an annular rack 16 is provided on the underside of the second movable plate 14 and held in mesh with a pinion 18. In this construction, each of the plates 13 and 14 is rotatable about an axis of the partition plate 9 driven by the pinion 17 or 18. The pinions 17 and 18 in turn are respectively rotated by actuators 19 and 20 which are mounted on the outer periphery of the housing 5.

As shown in FIGS. 2A, 2B, 3A and 3B, the fixed plate, or fixed disk, 12 is provided in a peripheral portion thereof with a through opening 21 whose area is relatively small. The first movable plate, or movable ring, 13 is provided with an arcuate recess 22 in a position thereof which corresponds to the hole 21 of the fixed disk 12. The recess 22 is so configured as to sequentially increase its depth and terminate at a through opening 23. In this construction, the first and second fluid chambers 10 and 11 are communicated to each other by a first orifice 24 which is defined by the opening 21 of the fixed disk 12 and the recess 22 and opening 23 of the movable ring 13. The length of the first orifice 24 is variable depending upon the distance between the openings 21 and 23, that is, it is controllable by rotating the movable ring 13.

Figure 2A:
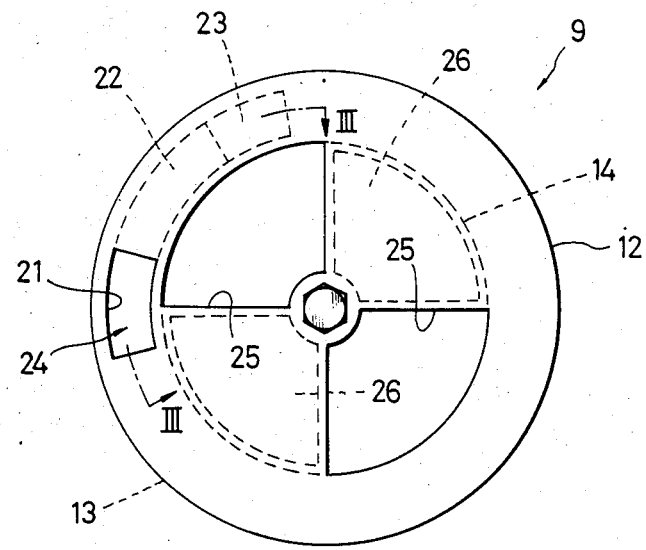
FIGS. 2A and 2B are plan views showing two different operating conditions of a partition plate which is included in the engine mount as shown in FIG. 1.
Figure 2B:
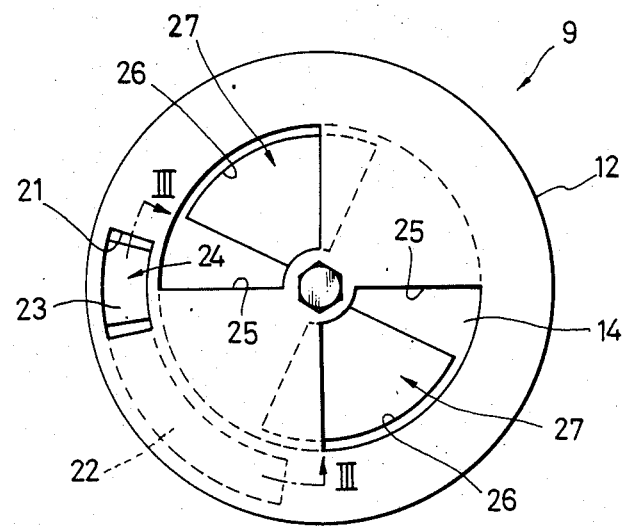

As shown in FIGS. 2A and 2B, the fixed disk 12 is provided in a central part thereof with a pair of sectorial openings 25 each having a central angle of substantially 90 degrees and spaced from the other by a circumferential distance of substantially 90 degrees. Likewise, the movable disk 14 is provided with a pair of sectorial openings 26 each having a central angle of substantially 90 degrees and spaced from the other by a circumferential distance of subtantially 90 degrees. The openings 25 and 26 constitute a second orifice 27 having a relatively large diameter. Specifically, when the openings 25 and 26 are aligned with each other, the fluid chambers 10 and 11 are communicated to each other through the second orifice 27. The effective sectional area of the second orifice 27 is variable with the relative position between the openings 25 and 26, that is, it is controllable by rotating the movable disk 14. As shown in FIG. 2A, when the openings 25 and 26 are dislocated by 90 degrees from each other, the second orifice 27 is fully closed.

The actuators 19 and 20 associated with the pinions 17 and 18, respectively, are controlled by a control circuit which generates a control signal in response to an engine speed signal. Specifically, in an engine idling range, the actuator 19 is operated in a direction for reducing the length of the orifice 24 as the engine speed increases, while in a high engine speed range the actuator 20 is operated in a direction for increasing the area of the orifice 27 as the engine speed increases. In a low engine speed range, on the other hand, the second orifice 27 is fully closed. In this particular embodiment, therefore, the actuators 19 and 20 and their associated control circuit constitute a first control device adapted to control the length of the orifice 24, and a second control device adapted to control the effective path area of the orifice 27.

Figure 3A:
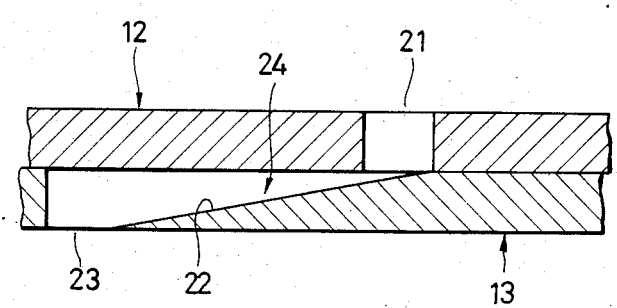
FIGS. 3A and 3B are sections taken along line III—III of FIGS. 2A and 2B, respectively.

In operation, while the engine is in an idling condition, the openings 25 of the fixed disk 12 and the openings 26 of the movable disk 14 remain deviated from each other by 90 degrees with the orifice 27 fully closed, as shown in FIG. 2A. When the engine speed is low, the distance between the opening 21 of the fixed disk 12 and the opening 23 of the movable disk 13 is greatest, as shown in FIGS. 2A and 3A; stated another way, the orifice 24 is longest. Under this condition, the fluid chambers 10 and 11 of the engine mount 2 are intercommunicated by the orifice 24 which is long and narrow as stated.

While the engine speed is low as stated above, the engine vibration is generally low in frequency and relatively large in amplitude. The rubber cushion 6, therefore, undergoes a substantial degree of deformation causing the fluid chamber 10 to expand and contract. As a result, the fluid in the fluid chambers 10 and 11 is forced to move through the orifice 24, the vibration being absorbed by the resonance of the fluid. In this instance, the mass of the fluid inside of the orifice 24 is great and, therefore, the dynamic spring constant of the engine mount 2 is small. In this manner, the vibrations in the low idling speed range are absorbed.

Figure 3B:
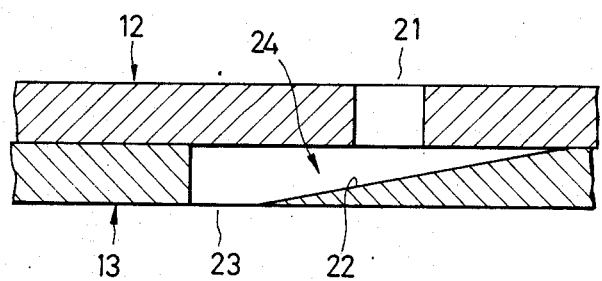

As the engine speed increases within the idling range, the actuator 19 is operated to rotate the movable ring 13 to thereby move the opening 21 of the fixed disk 12 and the opening 23 of the movable ring 13 toward each other, as shown in FIG. 3B. This shortens the orifice 24 and, thereby, reduces the mass of the fluid inside of the orifice 24. Further, because the recess 22 which communicates the openings 21 and 23 to each other has a sequentially increasing depth, the effective path area of the orifice 24 is increased. Consequently, the dynamic spring constant of the engine mount 2 is controlled to an adequate value for absorbing the instantaneous vibrations.

As soon as the engine speed reaches the highest one within the idling range, the opening 21 of the fixed disk 12 and the opening 23 of the movable ring 13 are fully aligned with each other, as shown in FIG. 2B. As the engine speed further increases, the actuator 20 is operated to rotate the movable disk 14 until the openings 25 of the fixed disk 12 and the openings 26 of the movable disk 14 overlap each other to open the orifice 27, as shown in FIG. 2B. As a result, communication is set up between the fluid chambers 10 and 11 of the engine mount 2 by both of the orifices 24 and 27.

In this manner, in the high speed range wherein the amplitude of vibration is small, the fluid is allowed to flow with ease between the fluid chambers 10 and 11 of the engine mount 12 so as to maintain the dynamic spring constant of the engine mount 2 small, whereby the high frequency vibrations are absorbed effectively. The dynamic spring constant depends upon the overlapping degree of the openings 25 of the fixed disk 12 and the openings 26 of the movable disk 14, i.e., the area of the orifice 27. Stated another way, the dynamic spring constant is controlled on the basis of the amount of rotation of the movable disk 14.

As described above, the amount of rotation of the movable ring 13 and that of the movable disk 14 are controlled to control the dynamic spring constant of the engine mount 2 in any of the idling to high speed ranges, thereby absorbing vibrations occurring at any of the engine speeds. It is to be noted that vibrations of large amplitudes occurring as during engine craking and car shaking are absorbed by the damper 3.

While the recess 22 which forms a part of the orifice 24 has been shown and described as sequentially increasing in depth so that the orifice 24 may be changed both in length and in effective path area, it may be provided with a uniform sectional area.

Further, the rotational motion of each of the movable members 13 and 14 which are associated with the orifices 24 and 27, respectively, may be replaced with a linear sliding motion, if desired.

What is claimed is:

1. A compound engine mount comprising:
   a first fluid chamber surrounded by a rubber cushion;
   a second fluid chamber surrounded by a flexible diaphragm and communicated to said first fluid chamber by a first orifice which is controllable in length and a second orifice which is controllable in effective path area;
   said first and second fluid chambers being filled with fluid;
   a first control device for controlling the length of said first orifice in response to an engine speed; and
   a second control device for closing said second orifice in an engine idling range and controlling the effective path area of said second office in response to an engine speed in a high engine speed range.

2. A compound engine mount as claimed in claim 1, wherein said first and second fluid chambers are separated from each other by a partition plate which consists of a fixed plate and a first and a second movable plate each being held in close contact with said fixed plate;
   said first orifice consisting of an opening of a small sectional area which is formed throughout said fixed plate and communicated to said first fluid chamber, an opening of a small area which is formed throughout said first movable plate and communicated to said second fluid chamber, and a passageway communicated to said openings, said first movable plate changing the length of said first orifice when moved;
   said second orifice comprising openings of a large area which are formed through said fixed and second movable plates, said second movable plate changing the effective path area of said second orifice when moved.

3. A compound engine mount as claimed in claim 2, wherein said first movable plate comprises an annular plate which faces a peripheral portion of said fixed plate, said second movable plate comprising a disk which is received in a center opening of said annular plate, said annular plate and disk being free to rotate relative to said fixed plate and driven in a rotational motion by said first and second control devices, respectively.

4. A compound engine mount as claimed in claim 2, wherein said passageway is defined by a recess provided in one of said fixed plate and first movable plate and the other of said plates, said recess being formed aslant so that a depth thereof is varied sequentially.

* * * * *